United States Patent [19]
Alpers

[11] Patent Number: 6,133,865
[45] Date of Patent: Oct. 17, 2000

[54] CW CONVERTER CIRCUIT

[75] Inventor: Frederick C. Alpers, Riverside, Calif.

[73] Assignee: The United States of America as represented by the Secretary of the Navy, Washington, D.C.

[21] Appl. No.: 05/316,599

[22] Filed: Dec. 15, 1972

[51] Int. Cl.[7] .................................................. G01S 7/36
[52] U.S. Cl. ........................ 342/13; 342/17; 342/98; 342/99; 342/195
[58] Field of Search ................................ 343/7 A, 16 M, 343/17.2 PC; 342/13, 16, 17, 18, 19, 62, 98, 99, 100, 172, 195, 197

[56] References Cited

U.S. PATENT DOCUMENTS

| | | | |
|---|---|---|---|
| 2,995,750 | 8/1961 | Holcomb et al. | 343/16 M |
| 3,135,957 | 6/1964 | Cunningham et al. | 343/7 A |
| 3,189,896 | 6/1965 | Schmidt et al. | 343/7 A |
| 3,396,395 | 8/1968 | Ball et al. | 343/16 M |
| 3,670,333 | 6/1972 | Winn | 342/14 |
| 3,707,718 | 12/1972 | Ames | 343/7 A |
| 3,728,724 | 4/1973 | Alpers | 342/83 |
| 3,733,604 | 5/1973 | Smith | 342/88 |
| 4,307,399 | 12/1981 | Love et al. | 342/150 |
| 5,623,266 | 4/1997 | Grigsby | 342/14 |

*Primary Examiner*—John B. Sotomayor
*Attorney, Agent, or Firm*—Harvey Fendelman; Michael A. Kagan; Thomas M. Phillips

[57] ABSTRACT

A circuit for use in anti-radar missile seekers or radar counter-measure receivers to convert the signals received from continuous wave radars into pulse signals so that the signals may be more readily detected and can be processed in the same signal processing circuitry used against pulse radars. The received signal is mixed with a frequency swept local oscillator signal, fed to a dispersive delay line and then detected.

5 Claims, 2 Drawing Sheets

CW CONVERTER CIRCUIT

BACKGROUND OF THE INVENTION

In electronic warfare or anti-radar missile operations against enemy radars, the large majority of radar signals encountered will be of the pulse type, but some will be of the continuous wave type. Equipment designed to receive and provide directional information from the pulse signals must be sufficiently broadband to cover the inherent pulse spectrum, and the receiver noise associated with this bandwidth makes the equipment incapable of receiving the relatively weak and narrow band continuous wave (CW) signals except at close range. Alternate non-pulse-type receiving circuitry could be provided for use at suitable ranges against the CW radars, but in order to provide both a rapid frequency search to find the enemy CW signals and at the same time have a high stability to remain tuned to them once detected, considerable complexity would be introduced.

SUMMARY OF THE INVENTION

The present invention provides a circuit which allows a pulse-type receiver to function against a CW source at acceptable ranges without large cost or complexity. The CW signals entering the receiver are mixed with a frequency swept local oscillator signal. The resultant modulated signal is fed to a dispersive delay line where the early-arriving higher frequency portions of the signal are delayed much longer than the later lower frequency portions during any given sweep interval, with the result that no signal reaches the output end of the delay line for a while, and then all portions of the swept signal arrive essentially simultaneously. These bursts or pulses of IF energy are detected and utilized. When utilized in an amplitude monopulse receiver, a matched pair of dispersive delay lines are used. Sum and difference monopulse signals are derived in the customary manner and are each mixed with a swept local oscillator signal as described above. In order to obtain the proper directional sense from the received signals, the sum and difference signals are summed before being fed to one of the dispersive delay lines. Where the intercept receiver is to function over wide frequency limits that encompass more than one radar frequency band, a double superheterodyne circuit is utilized with the sweeping and roll up of the signal taking place at the second mixer and following circuitry as described above. The circuit embodying the invention can also be used to discriminate between two or more CW signals of nearly the same frequency without recourse to very high stability circuits and fine tuning. The functioning of this circuit relies on the fact that CW signals at nearby frequencies will be processed simultaneously up to the dispersive delay line, at which point each signal will be rolled up, but at its own particular point in time relative to the start of the sweep cycle. Video pulses corresponding to the several input CW signals will occur in sequence at the output of the detector, with pulses that relate to the higher frequency CW signals occurring later. A gated circuit with proper time gating is then utilized to select a particular signal desired. A tracking loop then maintains the necessary gate timing to track the signal.

OBJECTS OF THE INVENTION

To provide a circuit that will convert received continuous wave radar signals to pulsed signals.

To provide a circuit that can select a CW radar signal from several simultaneously received CW radar signals that are separated by as little as a fraction of a megahertz, and provide automatic frequency tracking of the selected CW signal.

Other objects and many of the attendant advantages of this invention will be readily appreciated as the same becomes better understood by reference to the following detailed description when considered in connection with the accompanying drawings.

DESCRIPTION OF THE PREFERRED EMBODIMENTS

Figure 1:
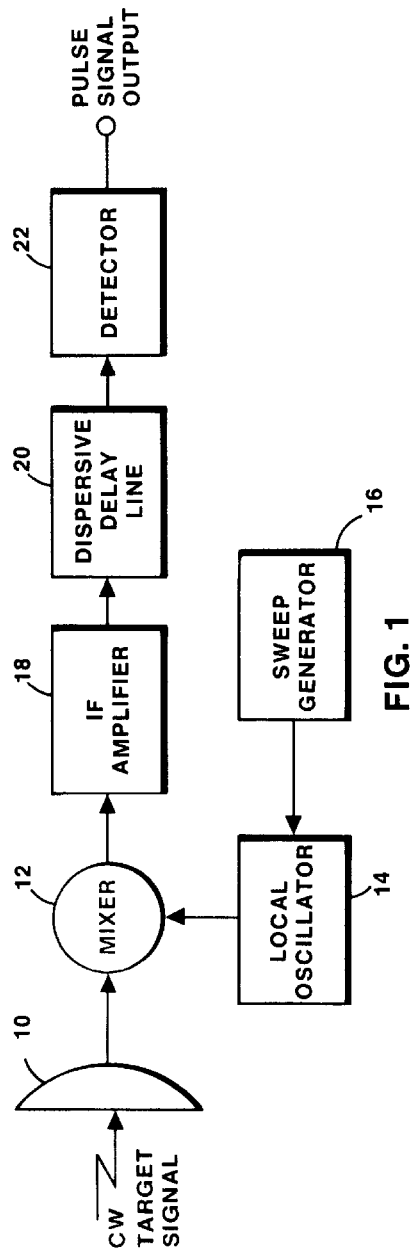
FIG. 1 shows a superheterodyne receiver circuit modified in accordance with the invention.

Referring now to the drawings wherein there is shown in FIG. 1 a superheterodyne receiver. The unmodulated CW signals enter receiver antenna 10 and are mixed in mixer 12 with the local oscillator signal from local oscillator 14 in the usual superheterodyne manner. A sawtooth wave sweep generator 16 is coupled to local oscillator 14 to provide a local oscillator signal that is swept in frequency in a sawtooth fashion. If local oscillator 14 is tuned below the frequency of the incoming signal, the sweep should be in the direction of increasing frequency; if tuned above, vice versa.

The signal entering IF amplifier 18 from mixer 12 is a sawtooth-frequency-modulated signal, with higher frequencies occurring first and in essentially linear decrease in frequency with time thereafter. After amplification, the frequency modulated signal is fed to dispersive delay line 20. In dispersive delay line 20 the early-arriving higher frequency portions of the signal are delayed much longer than the later lower frequency portions during any given sweep interval, with the result that no portion of the signal reaches the output end of delay line 20 for a time, and then all portions of the swept signal arrive essentially simultaneously. Thus the incoming energy received continuously during each sweep interval is "rolled up" into a burst or pulse of energy that emerges from delay line 20 at a point in time after that particular sweep has terminated. The output burst of IF energy is converted into a video pulse by means of detector 22 which may be of the simple diode type. The parameters of sweep generator 16 should be selected so that the linear frequency excursion which is imparted to the incoming signal is matched to the characteristics of dispersive delay line 20, which in turn should be matched to the IF amplifier bandwidth of IF amplifier 18. For example, for a dispersive line with a 100:1 compression ratio and a 5 MHz band-width, the sweep would have a total excursion of 5 MHz and a rate of 0.25 MHz per microsecond.

Figure 2:
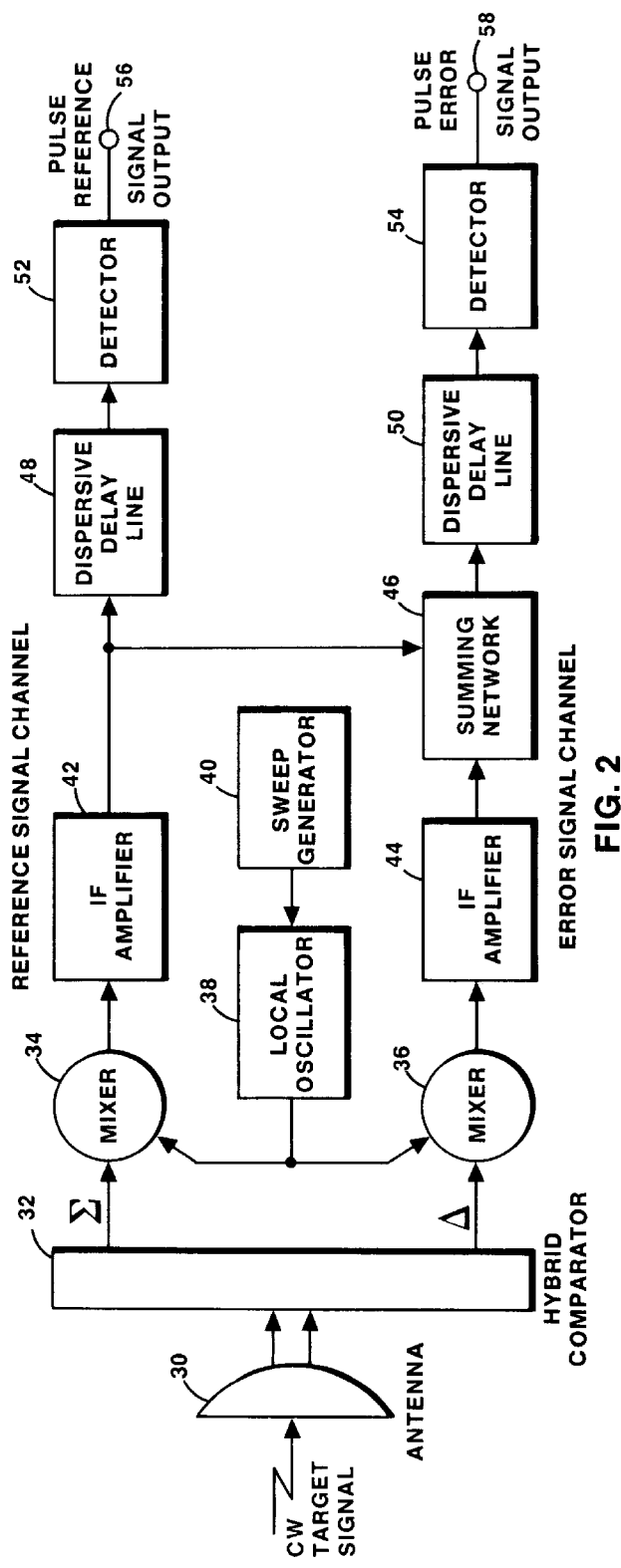
FIG. 2 shows the invention embodied in a monopulse direction finding receiver.

Referring now to the monopulse direction finding receiver of FIG. 2, the CW target signals are received by antenna 30 and fed to hybrid comparator 32 which provides the sum and difference signals. Sum signals are mixed in mixer 34 and difference signals are mixed in mixer 36 with the swept local oscillator signal from local oscillator 38 which is swept by sawtooth wave sweep generator 40. The modulated sum IF signal is fed to IF amplifier 42 and the modulated difference IF signal is fed to IF amplifier 44.

For obtaining the proper directional sense (i.e., right or left) it is necessary to check the relative phase (0° or 180°) of the sum channel and difference channel outputs. It is not practical with the relative very long delays of the dispersive delay lines to preserve the relative phase relationship. To avoid this problem, the outputs of the sum and difference IF amplifiers 42, 44 are combined in summing network 46 with phase preserved to form an "error signal" in lieu of simply a difference signal. Since relative phase is accurately preserved to this point, the error signal out of summing network 46 is larger than the sum (or "reference") signal when the sum and difference signals from the monopulse comparator are in phase (e.g., the CW source to the right of the antenna axes), and is less than the sum signal when the two are out of phase (e.g., the source lies to the left). After each frequency modulated signal is rolled up in the respective delay lines 48 and 50 (which must be matched both in delay characteristics and attenuation) and is detected in detector 52 and 54, the reference signals at terminal 56 and error signals at terminal 58 emerge as simultaneous pulse signals whose relative amplitude carries the desired directional information. This information may be extracted by well known signal processing techniques, for example the circuits disclosed in U.S. Pat. No. 3,093,821.

Figure 3:
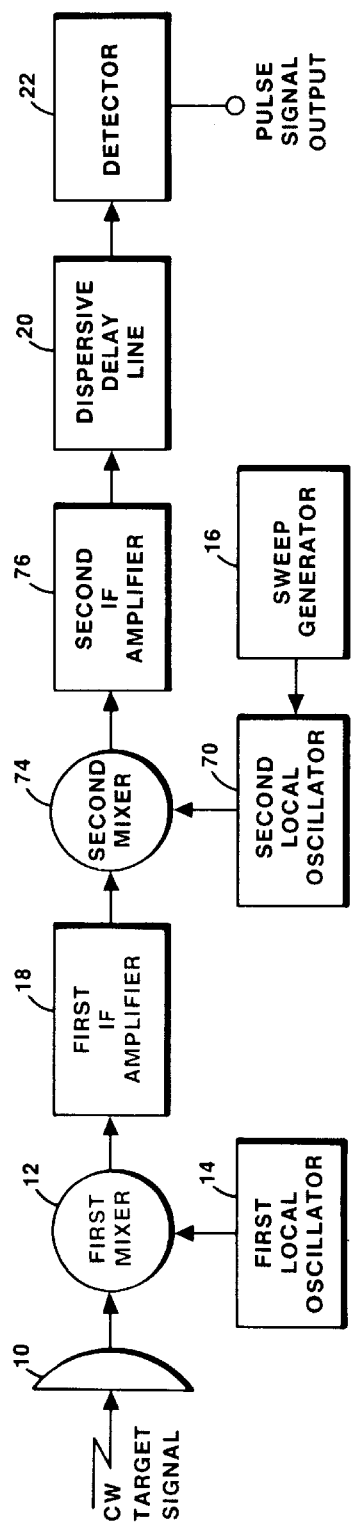
FIG. 3 shows application of the invention to a double superheterodyne receiver.

In situations where the receiver is to function over wide frequency limits that encompass more than one radar frequency band, and local oscillators are not available to meet the wide bandwidth requirements with suitable stability, the circuit of FIG. 3 may be desirable. In this circuit the second local oscillator 70 swept by sweep generator 16 is mixed with a first IF signal in mixer 74. The second IF signal is amplified in amplifier 76, fed to dispersive delay line 20 and detected in detector 22 in the same manner as shown in FIG. 1.

Figure 4:
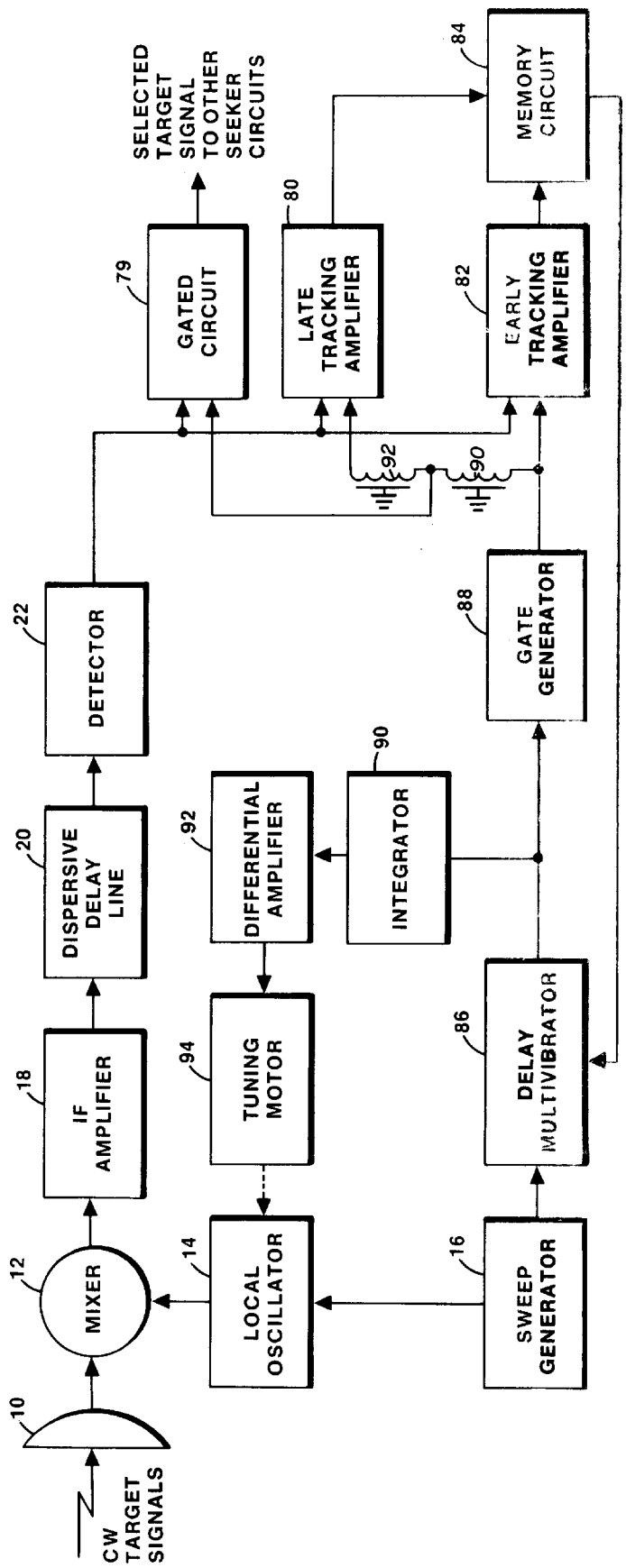
FIG. 4 shows a signal selection and tracking circuit embodying the invention.

A circuit that can discriminate between two or more CW signals of nearly the same frequency without recourse to very high stability circuits and fine timing is shown in FIG. 4. The tracking loop includes early and late tracking amplifiers 80 and 82, memory circuit 84, delay multivibrator 86, gate generator 88 and video (non-dispersive) delay lines 90 and 92. Delay multivibrator 86 is triggered by the start of each new sawtooth sweep cycle, and it in turn triggers gate generator 88 after a variable delay (of less than one sweep cycle) that is controlled by the voltage supplied by memory circuit 84.

The output gate signals from gate generator 88 are fed to early tracking amplifier 82, through delay line 90 to gated circuit 79 and to late tracking amplifier 80 through delay lines 90 and 92 in sequence. Coincidence of the video output pulse from detector 22 with either tracking amplifier results in an appropriate correction to the memory voltage of memory circuit 84 and consequently to delay multivibrator 86 for the next cycle. By this action the gate timing of gated circuit 79 is kept in track with the frequency of the particular incoming signal of interest.

In order to prevent "roll up" of the tracked signal near the very beginning or end of an ensuing sweep cycle, local oscillator 14 is adjusted by a "coarse" frequency control loop. The control loop acts more slowly than the tracking amplifier correction loop, but it is not "boxed in" by the IF amplifier and dispersive line limitations, and therefore can accommodate larger frequency drifts. In the coarse loop a simple RC integrator 90 develops a dc voltage proportional to the average percentage of time that one side of delay multivibrator is "on", and this voltage is compared to a suitable reference voltage by a differential amplifier circuit 92. Amplifier circuit 92 should be configured to provide a positive output voltage, for example, when the average delay of multivibrator is less than half a sweep cycle and a negative voltage when the average delay is more. The output voltages from amplifier 92 are fed to operate a tuning motor 94 that will adjust the frequency of local oscillator 14 slightly, and this in turn changes the video pulse timing at the output of detector 22. The change in timing then feeds back through the tracking amplifier and memory circuit control loop to keep multivibrator 86 action about midrange as desired.

Obviously many modifications and variations of the present invention are possible in the light of the above teachings. It is therefore to be understood that within the scope of the appended claims the invention may be practiced otherwise than as specifically described.

What is claimed is:

1. In an improved circuit for detecting and tracking continuous wave radar targets, the combination comprising:
    (a) antenna means for receiving continuous wave radar signals,
    (b) a sweep generator for generating a sawtooth wave signal,
    (c) local oscillator circuit means coupled to said sweep generator and producing an output signal varying linearly in frequency,
    (d) mixer circuit means coupled to said local oscillator circuit means and to said antenna means for producing an output IF signal that is a linearly frequency swept continuous wave,
    (e) a dispersive delay line coupled to said mixer circuit means for converting the swept frequency signal to a pulsed output signal,
    (f) detector circuit means coupled to the output of said dispersive delay line for providing video output pulses,
    (g) tracking circuit means coupled between said detector circuit means and said local oscillator for maintaining a target signal of a selected frequency at the output of said detector circuit means.

2. The circuit of claim 1 wherein said tracking circuit means includes a signal tracking loop for maintaining the detected signal within gated limits and a course frequency control loop for maintaining the selected target signal within the center of the sweep of said sweep generator output signal.

3. The circuit of claim 2 wherein said signal tracking loop includes:
    (a) a gated circuit having a first input coupled to the output of said detector circuit means and a gate signal input,
    (b) a late gated amplifier having a first input coupled to the output of said detector circuit means, a gate signal input and an output,
    (c) an early gated amplifier having a first input coupled to the output of said detector circuit means, a gate signal input and an output,
    (d) a variable delay multivibrator having a first input coupled to said sweep generator and a second input coupled to said early and late tracking amplifiers and being responsive to the signal from said sweep generator to generate an output signal after a delay determined by the output voltages from said early and late tracking amplifiers,
    (f) a gate generator coupled to and being responsive to an output signal from said variable delay multivibrator for generating output gate signals,
    (g) circuit means coupling the output of said gate generator directly to the gate signal input of said early gated amplifier, (h) first delay circuit means coupling the output of said gate generator to the gate signal input of said gated circuit, (i) second delay circuit means including said first circuit delay means coupling the output of said gate generator to the gate signal input of said late gated amplifier.

4. The circuit of claim 3 wherein said course frequency control loop includes:

(a) an integrator circuit coupled to the output of said variable delay multivibrator for providing a voltage proportional to the average percentage of time that one side of said multivibrator is on, (b) a differential amplifier having a reference and coupled to said integrator circuit for providing a control voltage proportional to the variation of the voltage from said integrator circuit from the reference, (c) a tuning motor coupled to said differential amplifier and to said local oscillator and being responsive to the control voltage to tune said local oscillator sufficiently to cause the trigger signal for said gate generator to occur near the middle of the ramp of the sawtooth wave signal output from said sweep generator.

5. In an improved circuit for detecting and tracking continuous wave radar targets, the combination comprising:

(a) a monopulse radar receiving antenna for receiving continuous wave radar signals, (b) a hybrid comparator coupled to said receiving antenna and providing sum and difference signal outputs, (c) a sweep generator for generating a sawtooth wave signal, (d) local oscillator circuit means coupled to said sweep generator and producing an output signal varying linearly in frequency, (e) a first mixer circuit means coupled to said local oscillator means and to the sum signal output of said comparator for producing a first IF signal that is a linearly frequency swept continuous wave, (f) a second mixer circuit means coupled to said local oscillator means and to the difference signal output of said comparator for producing a second IF signal that is a linearly swept continuous wave, (g) a summing network having a first input coupled to the output of said first mixer circuit means and a second input coupled to the output of said second mixer circuit means for providing an error signal, (h) a first dispersive delay line coupled to said first mixer circuit means and providing a pulsed output reference signal, (i) a second dispersive delay line coupled to said summing network and providing a pulsed output error signal.

* * * * *